No. 669,234. Patented Mar. 5, 1901.
J. T. FUHRMANN & E. NELSON.
MOTOR.
(Application filed Mar. 5, 1900.)
(No Model.)
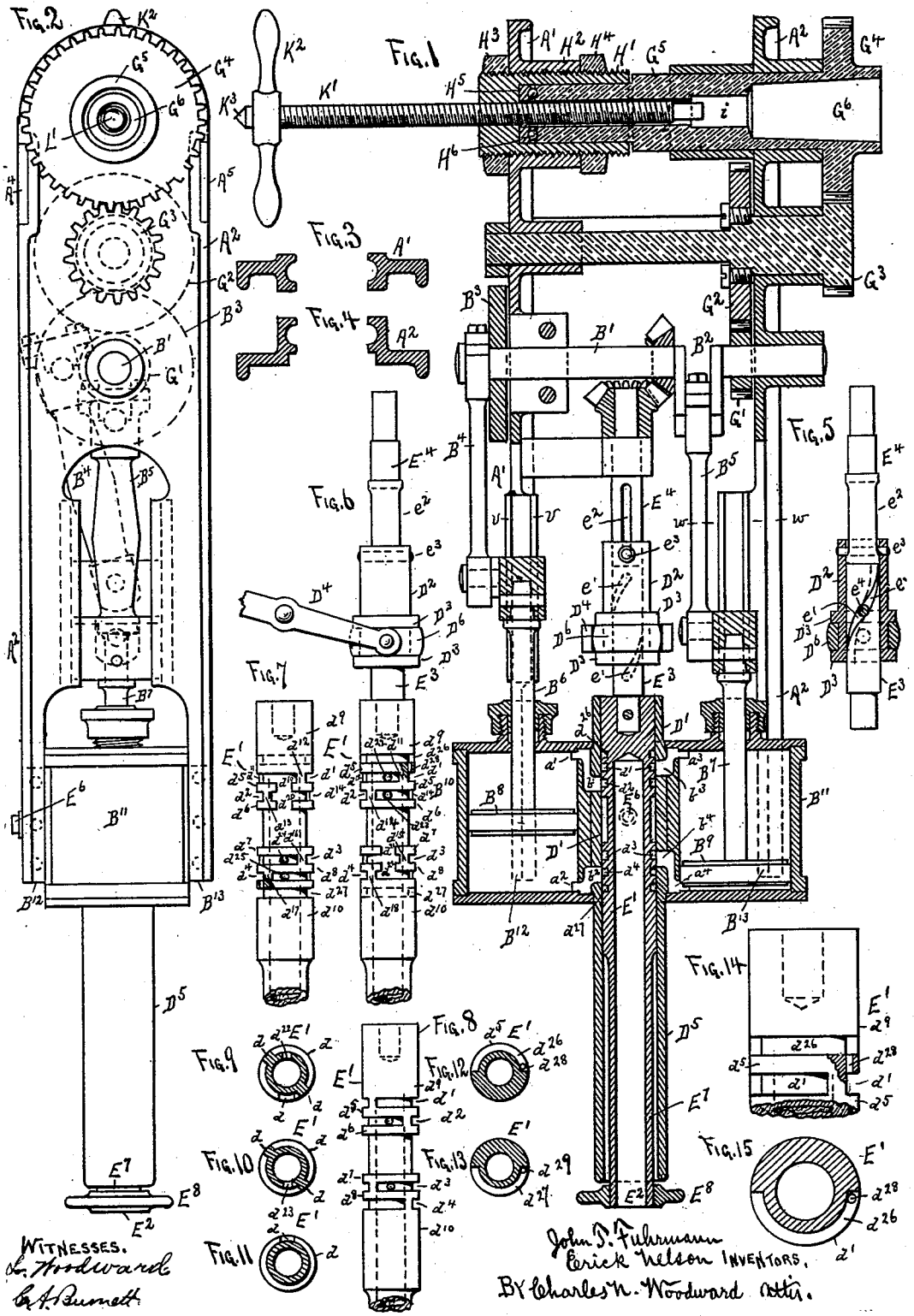

UNITED STATES PATENT OFFICE.

JOHN T. FUHRMANN AND ERICK NELSON, OF ST. PAUL, MINNESOTA.

MOTOR.

SPECIFICATION forming part of Letters Patent No. 669,234, dated March 5, 1901.

Application filed March 5, 1900. Serial No. 7,413. (No model.)

*To all whom it may concern:*

Be it known that we, JOHN T. FUHRMANN and ERICK NELSON, citizens of the United States, residing at St. Paul, in the county of Ramsey and State of Minnesota, have invented certain new and useful Improvements in Steam or Pneumatic Motors, of which the following is a specification.

This invention relates to motors adapted to be operated by steam or compressed air; and it consists in the construction, combination, and arrangement of parts, as hereinafter shown and described, and specifically pointed out in the claims.
In the drawings, Figure 1 is a sectional side elevation. Fig. 2 is a front elevation. Fig. 3 is a cross-section of one side of the frame on the line $v\,v$ of Fig. 1. Fig. 4 is a cross-section of one side on the line $w\,w$ of Fig. 1. Fig. 5 is a detached sectional detail of the mechanism for actuating and reversing the valve. Fig. 6 is a side view of the valve detached, showing the reversing mechanism and one side of the valve. Fig. 7 is a side view of the valve from the opposite side of Fig. 6. Fig. 8 is a side view of the valve at right angles to that shown in Fig. 7. Fig. 9 is a cross-section of the valve on the line $x\,x$ of Fig. 8. Fig. 10 is a cross-section of the valve on the line $z\,z$ of Fig. 8. Fig. 11 is a cross-section of the valve on the line $y\,y$ of Fig. 8. Fig. 12 is a cross-section on the line $u\,u$ of Fig. 7, and Fig. 13 is a cross-section on the line $t\,t$ of Fig. 7. Fig. 14 is an enlarged detail of one end of the valve, illustrating the construction of the "balancing-groove" and its inlet. Fig. 15 is a cross-section on the line $s\,s$ of Fig. 14.

$A'\,A^2$ represent the frame on which the apparatus is supported, and which is formed in two parts united by cross-braces $A^3\,A^4$ and provided with a main shaft $B'$, having a crank $B^2$ and crank face-plate $B^3$ and connected to be actuated by connecting-rods $B^4\,B^5$, piston-rods $B^6\,B^7$, and pistons $B^8\,B^9$, working in cylinders $B^{10}\,B^{11}$, as shown, the cylinders having "ports" $a'\,a^2\,a^3\,a^4$ in their adjacent sides, as shown. The two cylinders are both cast in one piece with a central circular valve-chamber, in which a circular sleeve $D'$ is fitted and adapted to be oscillated vertically. The sleeve $D'$ is formed to project some distance below the lower ends of the cylinders, as shown at $D^5$, to form a "hand-grip," the projection also providing for the oscillation of the sleeve, as hereinafter explained. The lower portions of the side frames $A'\,A^2$ are forked, as shown in Fig. 2, and embrace the sides of the cylinders, to which they are connected by "wings" or ribs, as shown at $B^{12}\,B^{13}$. The sleeve $D'$ is provided with ports $b'\,b^2\,b^3\,b^4$, so set as not to come opposite each other, as shown in Fig. 1.

The crank $B'$ and face-plate $B^2$ are arranged "quartering," as shown, so that the engine will not get on the center.
The valve is of the "rotative" form and consists of a tube $E'$, provided with four channels $d'\,d^2\,d^3\,d^4$ at intervals around its surface, the rings $d^5\,d^6\,d^7\,d^8$, formed by the channels, and the "lands" or body portions $d^9$ $d^{10}$, above and below the end channels, forming the bearing-surface of the valve, which fits steam-tight within the sleeve $D'$. On opposite sides of the tubular valve between the ring $d^5$ and land $d^9$ are formed "bridges" $d^{11}\,d^{12}$ across the channel $d'$, and similarly across the channel $d^2$ are formed bridges $d^{13}$ $d^{14}$, but in reversed position or quartering to the bridges $d^{11}\,d^{12}$. Similarly across the channels $d^3\,d^4$ are formed bridges $d^{15}\,d^{16}$ and $d^{17}\,d^{18}$, the bridges $d^{15}\,d^{16}$ being reversed from or quartering to the bridges $d^{17}\,d^{18}$. Thus the bridges $d^{11}\,d^{15}$ come in line perpendicularly and the bridges $d^{12}\,d^{16}$ come in line perpendicularly, while the bridges $d^{14}$ $d^{18}$ come in line perpendicularly and the bridges $d^{13}\,d^{17}$ come in line perpendicularly, but reversely to the bridges $d^{14}\,d^{18}$. Channels $d^{19}\,d^{20}$ are cut through the rings $d^5\,d^6$, as shown in Fig. 7, while similar channels $d^{21}$ $d^{22}$ are likewise cut through the rings $d^7\,d^8$, as shown in Fig. 6, so as to provide channels for the air or steam to reach the ports $b'\,b^2$ $b^3\,b^4$ and $a'\,a^2\,a^3\,a^4$.

The port $b'$ in the sleeve $D'$ comes opposite the channels $d^2$, formed by the rings $d^5\,d^6$, the port $b^2$ comes opposite the channel $d^4$, formed by the rings $d^8$ and land $d^{10}$, the port $b^3$ comes opposite the channel $d'$, formed by the ring $d^5$ and land $d^9$, while the port $b^4$ comes opposite the channel $d^3$, formed by the rings $d^7\,d^8$, as shown.

Above the uppermost channel $d'$ is formed a half-channel $d^{26}$, encircling one-half the valve $E'$ and connected to the channel $d'$ by a vent $d^{28}$, so that steam or compressed air will be admitted to the half-channel $d^{26}$ to create a back pressure therein against the walls of the valve to counteract the pressure exerted upon the opposite side of the valve, and thus "balance" the upper end of the valve and prevent unequal wear. A similar half-channel $d^{27}$ is arranged below the lowermost channel $d^4$ on the reversed side of the valve and provided with a vent $d^{29}$, communicating with the adjacent channel $d^4$ to admit steam or compressed air to the half-channel $d^{27}$ to balance the lower end of the valve in the same manner. By this means the valve E' is uniformly balanced and unequal wear prevented.

Means are provided for reversing the motion of the motor by reversing the position of the valve E', whereby the position of the bridges is reversed and the direction of the entering air or steam correspondingly reversed. The mechanism for accomplishing this reversing is shown in Figs. 1, 5, and 6. The valve-stem is formed in two parts $E^3$ $E^4$, with the abutting ends inclosed by a sleeve $D^2$, as shown, the sleeve slidable loosely upon the two-part stem. The upper section $E^4$ of the valve-stem is provided with a slot $e^2$, through which a pin $e^3$ in the sleeve $D^2$ fits, so that while the sleeve is left free to slide upon the two-part stem the upper section $D^2$ will revolve with the sleeve. The lower section $E^3$ of the valve-stem is provided with a diagonal groove $e'$, into which pins in the sleeve $D^2$ fit, as shown in Fig. 5. The sleeve $D^2$ is provided with ribs $D^3$, between which a collar $D^6$ fits loosely. The collar $D^6$ is provided with lateral studs, with which a forked lever $D^4$ engages, the movement of the lever, as will be readily understood, serving to move the sleeve $D^2$ upward and downward upon the two-part stem $E^3$ $E^4$. This movement of the sleeve $D^2$ does not affect the upper section $E^4$ of the valve-stem, as the pin $e^3$ merely runs in the straight slot $e^2$, but turns the lower section $E^3$ one-half around by the action of the pins $e^4$ in the diagonal slots $e'$ in the lower valve-stem section $E^3$, and thus reverses the position of the valve, and thus reverses the direction of the steam or compressed air entering the cylinders and correspondingly reverses the motor. The valve E' is extended, as shown at $E^7$, and provided at the extremity of the extension with a hand-wheel $E^8$, by which it may be actuated, if desired, when the reversing mechanism is not in use, the hand-wheel coming below the end of the hand-grip $D^5$, as shown.

The exhaust-ports are shown at $d^{22}$ $d^{23}$ $d^{24}$ $d^{25}$, leading from the channels formed by the rings $d^5$ $d^6$ $d^7$ $d^8$ and lands $d^9$ $d^{10}$ into the interior of the valve E', and thence to the open air at $E^2$.

The steam or compressed air is introduced into the central space, as indicated at $E^6$ in Fig. 2, between the rings $d^6$ $d^7$ and maintains a constant pressure at that point, and leads from thence to the ports through the "cuts" $d^{19}$ $d^{20}$ $d^{21}$ $d^{22}$ and the channels formed by the rings $d^5$ $d^6$ $d^7$ $d^8$ and lands $d^9$ $d^{10}$, as before stated. As the valve E' revolves the steam or air is alternately admitted to and cut off from the ends of the cylinders alternately through the ports $b'$ $b^2$ $b^3$ $b^4$, the bridges $d^{11}$ $d^{12}$ $d^{13}$ $d^{14}$ $d^{15}$ $d^{16}$ $d^{17}$ $d^{18}$ forming the means for cutting off the steam or air and providing for the exhaust.

The shaft B' may be connected to any driving mechanism to be employed for any desired purpose, and for the purpose of illustration we have shown it in the drawings connected through gears G' $G^2$ $G^3$ $G^4$ to drive a shaft $G^5$, to which a drill or other implement may be connected. The outer end of the shaft $G^5$ is provided with a socket $G^6$, and the inner end of the shaft is reduced in size and fits into a sleeve H', the latter screw-threaded in its exterior and fitting into a screw-threaded collar $H^2$ on the side A' of the frame, the sleeve H' being further supported by jam-nuts $H^3$ $H^4$, as shown. The drive-shaft $G^5$ is formed with a slot $i$ entirely through it across the inner socket $G^6$ to provide for the insertion of a drift-bolt or wedge to force the butt-end of the drill or other tool held in the socket free from the socket when the tool is to be removed. In the bottom of the sleeve H' is a bearing-plate $H^5$, against which the inner end of the reduced inner end of the shaft $G^5$ runs, antifriction-balls $H^6$ being interposed between the end of the shaft and the plate, as shown, to reduce the friction to a minimum. A feed-screw K' is tapped through the rear of the sleeve H' and projects through the shaft $G^5$ to the socket $G^6$, as shown. The screw K' is shown provided with hand-levers $K^2$, by which it may be actuated. The extreme outer point of the screw K' will be pointed, as at $K^3$, to provide for its use against a back center when required to support the drill. By this simple arrangement means are provided for feeding the drill, together with the framework and its attachments, to the work.

The device may be employed with one cylinder, if preferred. The motor may be likewise reversed by turning the sleeve D' one-half around, and by turning it one-fourth around the "blind" parts of the sleeve will be brought opposite the ports $b'$ $b^2$ $b^3$ $b^4$, and thus cut off the steam or air entirely. The sleeve D' can thus be used to reverse the engine or as a "throttle" to govern the supply of steam or air.

Having thus described our invention, what we claim as new is—

1. In a steam or pneumatic motor, two cylinders having pistons and piston-rods, and connected to impart motion and with ports at each end through their adjacent sides, a casing inclosing a circular cavity between said cylinders, a circular hollow valve fitting said cavity and with encircling channels and cut-off bridges and exhaust-cavities connecting said channels, exhaust-ports leading into the interior of said valve through said channels, a channel encircling one-half of said valve above the uppermost channel on one side and a channel encircling one-half of the reverse side of said valve below, the lowermost channel, and vents connecting each of said half-channels with the adjacent whole channel, whereby the valve is balanced, substantially as and for the purpose set forth.

2. In a steam or pneumatic motor, a cylinder having inlet-ports and with a piston and piston-rod connected to actuate a shaft, a tubular sleeve having ports registering with the ports in said cylinder, a circular valve fitting said sleeve and having channels and with cross-bridges in said channels, exhaust-ports leading into the interior of said valve through said channels, and means for revolving said valve, and means for oscillating said sleeve to cut off the steam or air or to reverse the engine, substantially as and for the purpose set forth.

3. In a steam or pneumatic motor, two cylinders having pistons and piston-rods, and connected to impart motion and with ports at each end through their adjacent sides, a casing inclosing a circular cavity between said cylinders, a sleeve fitting said cavity and extended below said cylinders to form a gripping-handle and adapted to be oscillated and provided with ports alternately registering with the ports in said cylinders, a circular hollow valve within said sleeve and having encircling channels and cut-off bridges and exhaust-cavities, connecting said channels, exhaust-ports leading into the interior of said valve from said channels, and means for continuously revolving said valve simultaneously with the motion of said piston and piston-rods, substantially as and for the purpose set forth.

In testimony whereof we have hereunto set our hands in the presence of two subscribing witnesses.

JOHN T. FUHRMANN.
ERICK NELSON.

In presence of—
  C. N. WOODWARD,
  A. LINDAHL.